United States Patent [19]
Henderson

[11] Patent Number: 5,310,449
[45] Date of Patent: May 10, 1994

[54] PROCESS OF MAKING A SOLID STATE MICROANEMOMETER

[75] Inventor: H. Thurman Henderson, Cincinnati, Ohio

[73] Assignee: University of Cincinnati, Cincinnati, Ohio

[21] Appl. No.: 95,948

[22] Filed: Jul. 22, 1993

Related U.S. Application Data

[62] Division of Ser. No. 626,304, Dec. 12, 1990, Pat. No. 5,231,877.

[51] Int. Cl.$^5$ .............. H01L 21/306; B44C 1/24; C03C 15/00; C03C 25/06
[52] U.S. Cl. ................... 156/628; 156/648; 156/651; 156/657; 156/662; 437/228
[58] Field of Search ............. 156/628, 643, 647, 648, 156/651, 653, 654, 657, 659.1, 662; 29/25.35, 620, 621.1; 73/514, 517 R, 727, 517 AV, 517 A; 437/225, 228, 238, 901, 918, 921, 986

[56] References Cited

U.S. PATENT DOCUMENTS

| | | |
|---|---|---|
| 4,478,076 | 10/1984 | Bohrer . |
| 4,478,077 | 10/1984 | Bohrer . |
| 4,501,144 | 2/1985 | Higashi et al. . |
| 4,548,078 | 10/1985 | Bohrer et al. . |
| 4,624,137 | 11/1986 | Johnson et al. . |
| 4,651,564 | 3/1987 | Johnson et al. . |
| 4,682,503 | 7/1987 | Higashi et al. . |
| 4,683,159 | 7/1987 | Bohrer et al. . |
| 4,696,188 | 9/1987 | Higashi . |
| 4,706,061 | 11/1987 | Johnson . |
| 4,721,938 | 1/1988 | Stevenson ............... 156/647 X |
| 4,739,657 | 4/1988 | Higashi et al. . |
| 4,776,924 | 10/1988 | Delapierre ............... 156/647 X |
| 4,784,721 | 11/1988 | Holmen et al. . |
| 4,930,347 | 6/1990 | Henderson . |
| 4,966,037 | 10/1990 | Summer et al. .......... 73/204.26 |

FOREIGN PATENT DOCUMENTS 0203622 12/1986 European Pat. Off. .

OTHER PUBLICATIONS

J. D. Mosley "Silicon Miscostructures Lets Manufacturers Implement a Variety of Sensor on Chip" in Electrical Design News, pp. 76, 77, Nov. 1987.

Sundberg "Microtonic Flow Tranducer in NTIS" Tech Briefs pp. 29, 30, May. 1989.

Allen, Roger, "Solid State Sensors", Electronic Design, Nov. 13, 1986.

Hsieh, M. Walter, "Development of An Integrated Gas Flow Tranducer Based Upon Deep Impurities and Anisotropic Etching", Department of Electrical and Computer Engineering, University of Cincinnati, Mar. 3, 1987.

Gallant, John, "Sensors offer fast response times", EDN, May 25, 1989.

Sundberg, Galer, "Microtonic Flow Transducer", NASA Tech Briefs, May 1989.

Henderson, H. T., Hsieh, W., "A Miniature Anemometer for Ultrafast Response", Sensors, Dec. 1989.

Van Putten, A. F. P., "An Integrated Silicon Double Bridge Anemometer", Solid State Group, Department of Electrical Engineering, Twente University of Technology, P.O. Box 217, 7500 AE Enschede, The Netherlands, 1983.

*Primary Examiner*—William Powell
*Attorney, Agent, or Firm*—Wood, Herron & Evans

[57] ABSTRACT

A solid state microanemometer is micromachined from a crystal to a shape with four thick external sides that define an outer rectangle, four thin sections that define an inner rectangle and four diagonally directed branches interconnecting the corners of the outer rectangle to the inner rectangle. Four semiconductor resistors located on the four inner sections form a sensing bridge. Each external side has a pair of electrical contacts that are electrically interconnected, via conductive leads that extend along the diagonal branches and partially along the inner sections, to one of the semiconductor resistors. The physically connected semiconductor resistors and external sides form a rugged solid state device, while thermal and electrical isolation of the resistors from each other permits higher operating temperatures and improved fluid flow sensing capability.

12 Claims, 2 Drawing Sheets

PROCESS OF MAKING A SOLID STATE MICROANEMOMETER

This is a division of application Ser. No. 07/626,304, filed Dec. 12, 1990, issued Aug. 3, 1993 as U.S. Pat. No. 5,231,877.

FIELD OF THE INVENTION

This invention relates to a solid state microanemometer with improved structural integrity, sensing capability and versatility in application.

BACKGROUND OF THE INVENTION

An anemometer is a device which measures the velocity and direction of fluid flow. A solid state microanemometer is disclosed in applicant's U.S. Pat. No. 4,930,347, a patent that is commonly owned by the assignor of this application. Basically, the solid state microanemometer disclosed in U.S. Pat. No. 4,930,347 relies upon substantial thermal and electrical isolation of the resistor legs to provide high temperature sensitivity and fast response time. This device is readily adaptable for use in a wide variety of applications. For instance, an array of these devices may be connected to associated computer interfaces to provide "intelligent" sensing of microflow patterns for medical, industrial or other applications.

For many applications, it is necessary for an anemometer to withstand varying degrees of mechanical vibration over a long period of time. Otherwise, frequent breakage would necessitate excessive material and labor costs associated with replacement. Especially in sensing liquid flow, solid state anemometers seem to be particularly susceptible to conditions of mechanical or physical wear.

In short, the success of a solid state anemometer depends not only upon its high temperature sensitivity and fast response time, but also upon its ability to maintain these qualities under conditions of mechanical stress over a period of time.

Moreover, it is known that raising the operating temperature of an anemometer increases its sensing capability. For an anemometer of the type shown in U.S. Pat. No. 4,930,347, which utilizes self-heating resistors, this would suggest operation of the device at a higher current to increase the operating temperature of the resistors. However, because the self-heating resistors are interconnected by silicon, which has a high thermal conductivity, an increased current magnifies thermal shorting between the resistors, and thereby diminishes the capability of the device to detect small temperature differences. This capability is necessary for accurate sensing of fluid flow direction.

SUMMARY OF THE INVENTION

It is thus an object of this invention to provide a highly sensitive solid state microanemometer with the structural integrity necessary to withstand mechanical vibration.

It is another object of the invention to provide an improved solid state microanemometer with optimal temperature sensitivity, response time, structural rigidity and versatility in application.

It is still another object of the invention to provide a solid state microanemometer capable of withstanding mechanical stresses associated with liquid flow.

It is still another object of this invention to provide a structurally rigid solid state microanemometer capable of operation at a higher temperature to improve sensitivity.

This invention contemplates a solid state microanemometer with a semiconductor resistor flow sensing bridge that is micromachined from a single semiconductor crystal, wherein the resistors that form the sensing bridge are thermally and electrically isolated from each other and substantially thermally and electrically isolated from the rest of the crystal. This structure combines structural rigidity with optimum sensing capability and versatility in application.

This invention further contemplates a solid state microanemometer that is micromachined from a single semiconductor crystal to a shape with four external sides defining an outer rectangle, four inner sections defining an inner rectangle, and four diagonally directed branches connecting the corners of the inner and outer rectangles adjacent a top surface of the crystal. Additionally, a membrane layer spans across the external sides, beneath the inner section, providing additional structural support between the outer and inner rectangles. The semiconductor resistors are located on the inner sections and are interconnected to conductive leads that traverse the branches and terminate at electrical contacts located around the outer rectangle. The resistors form a sensing bridge for sensing fluid flow across the top of the crystal.

The interconnections among the relatively thick external sides, the thin membrane layer and the thin branches provide rigid support for the resistor flow sensing bridge supported on the inner sections, a feature which is particularly advantageous in an environment exposed to mechanical vibration, liquid flow, or both. Overall, this structural configuration optimizes thermal sensitivity, response time, physical ruggedness and versatility in application for a solid state microanemometer.

According to a preferred embodiment of the invention, this solid state microanemometer includes four semiconductor resistors, eight conductive leads and eight electrical contacts located in substantially the same plane on a single semiconductor crystal that has been machined to a desired shape. The four resistors are integrally formed on the inner sections, with each resistor located between and below parallel portions of a pair of conductive leads deposited on the top surface of the crystal. Each conductive lead has another portion that traverses a branch and terminates at an electrical contact deposited on the top surface of one of the external sides of the crystal. Each resistor is electrically connected to a pair of conductive leads which connect to a pair of electrical contacts located on one side of the outer rectangle.

With all four resistors forming a sensing bridge, an external device such as a voltage source may be connected to the contacts to form a Wheatstone Bridge. Alternately, any one or more of the resistors could be used in a sensing capacity without necessarily connecting all four as a Wheatstone Bridge. Electrical connection to one or more external devices may be accomplished by etching through a bottom of the external sides of the crystal to access the bottoms of the contacts. This manner of external connection improves the overall structural rigidity of the device when in use.

Both this device and the solid state microanemometer shown in U.S. Pat. No. 4,930,347 rely upon self-heating of the semiconductor resistors. However, on a comparative basis, the four resistors forming the sensing bridge for this microanemometer are physically connected to each other only by silicon dioxide, which is thermally and electrically non-conductive. As a result, with this invention, improved thermal and electrical isolation of four semiconductor resistors has been achieved and higher operating temperatures are possible.

Moreover, because two separate contacts are provided for adjacently situated resistors, this solid state microanemometer has increased versatility in application. This microanemometer may be used to detect fluid flow by sensing the temperature decrease across two parallel resistors. The direction of flow may be detected by measuring and comparing the resistances of the parallel resistors, due to the fact that the upstream resistor is cooled slightly more than the downstream resistor, with respect to the direction of fluid flow. One or more of the four self-heating resistors may be used as sensors for a microanemometer in any of the modes commonly used to detect fluid flow, i.e., constant input voltage, constant input current, or constant resistance with feedback.

Finally, with only a slight topographical change to the processing steps for the crystal, one or more of the resistors could be used as Resistive Thermal Devices (RTDs). This would require micromachining the crystal to form an additional, diagonally connected self-heating resistor and etching away the bottoms of the four resistors that form the sensing bridge.

These and other features of the invention will be more readily understood in view of the following detailed description and the drawings.

DETAILED DESCRIPTION OF THE DRAWINGS

FIGS. 1-4 show an improved solid state microanemometer 10 in accordance with a preferred embodiment of the invention. The improved microanemometer 10 is micromachined out of a single semiconductor crystal 12. Preferably, the crystal 12 is silicon that has initially undergone doping with a deep level impurity, i.e., gold, to provide increased sensitivity due to an exponential relationship between free carrier concentration and temperature. The concentration of this deep level doping is about $10^{15}$ A/cm$^2$, and can be accomplished through an "open tube" process, as described in U.S. Pat. No. 4,930,347. This patent is expressly incorporated herein by reference in its entirety. The crystal 12 is also preferably counterdoped with phosphorus to a density of about $5 \times 10^{14}$ A/cm$^3$. Subsequent to deep level doping, the crystal 12 is thermally oxidized to create a silicon dioxide (SiO$_2$) layer on at least the top and bottom surfaces. Thereafter, the crystal 12 is micromachined to a desired shape that promotes high temperature sensitivity, fast response time, structural rigidity and versatility in application.

Figure 1:
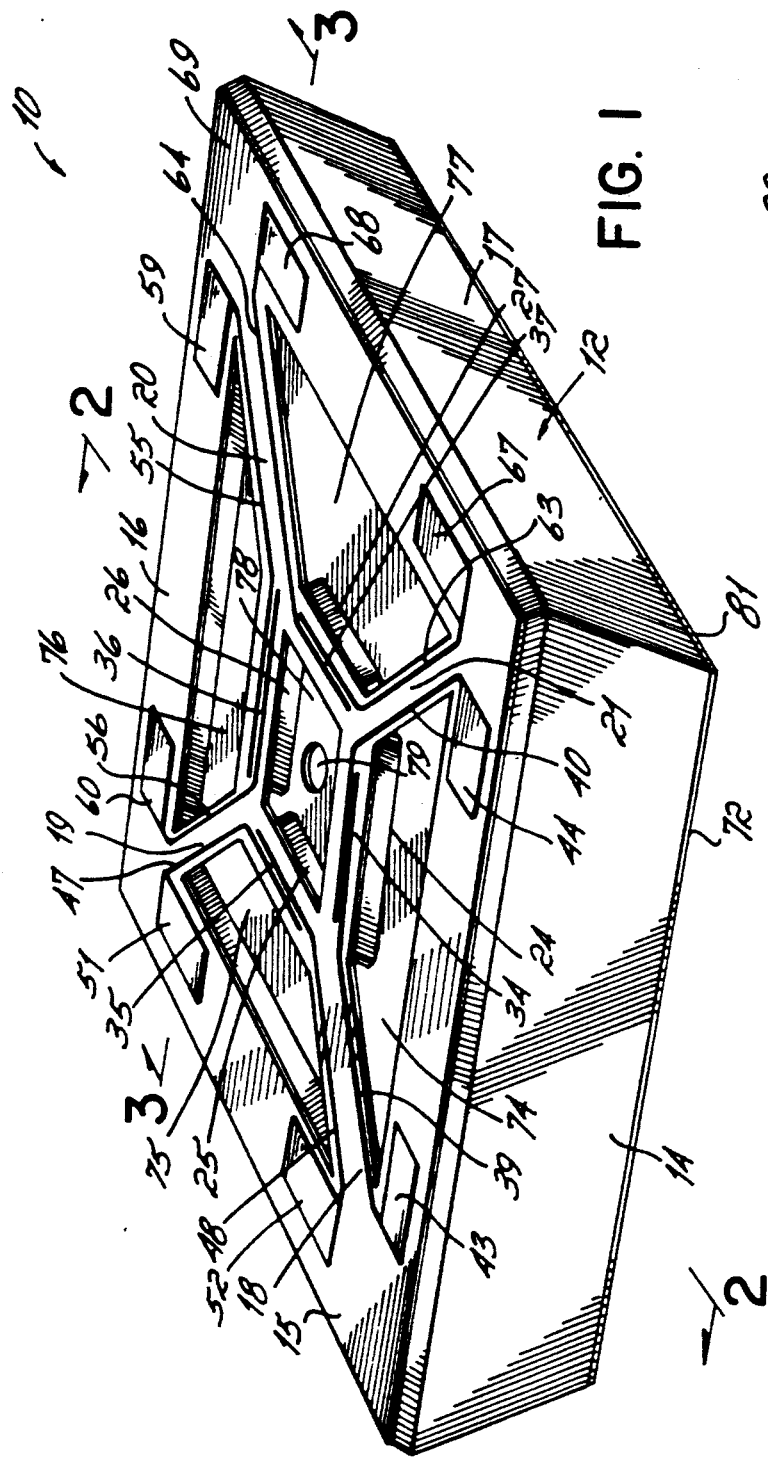
FIG. 1 is a perspective view of a solid state microanemometer in accordance with a preferred embodiment of the invention.

As shown in FIG. 1, a preferred shape of the micromachined crystal 12 includes four external sides 14, 15, 16 and 17 which generally define an outer rectangle. Four diagonally directed branches 18, 19, 20 and 21 extend inwardly from the corners of this outer rectangle. The inner ends of the branches 18, 19, 20 and 21 connect to the corners of an inner rectangle defined by inner sections 24, 25, 26 and 27. Basically, the solid state microanemometer 10 formed from this crystal 12 includes four semiconductor resistors located on the inner sections 24, 25, 26 and 27. The resistors act as a sensing bridge for detecting fluid flow across a top surface of the crystal 12. Conductive leads extend along the diagonal branches and interconnect the resistors with electrical contacts located on the outer rectangle. Each resistor is connected between a pair of conductive leads and a pair of contacts. This solid state microanemometer has optimum structural rigidity, response time, heat dissipation and versatility in application. These advantages result primarily from the thermal and electrical isolation of the resistors from each other, the substantial thermal and electrical isolation of the resistors from the branches and external sides, and the independent electrical connectability of one or more of the resistors.

More particularly, resistor 34 is located on inner section 24, resistor 35 is located on inner section 25, resistor 36 is located on inner section 26, and resistor 37 is located on inner section 27. Resistor 34 is located between parallel portions of conductive lead 39 and conductive lead 40. The non-parallel portions of conductive leads 39 and 40 extend along branches 18 and 21, respectively, to a pair of electrical contacts. Lead 39 connects to electrical contact 43, and lead 40 connects to electrical contact 44. Contacts 43 and 44 are located on external side 14. Similarly, resistor 35 is located between parallel portions of conductive leads 47 and 48. A portion of conductive lead 47 extends along branch 19 and connects to electrical contact 51. A portion of electrical lead 48 extends along branch 18, parallel with lead 39, and connects to electrical contact 52. On another side of the crystal 12, parallel portions of electrical leads 55 and 56 are located on opposite sides of resistor 36. A portion of electrical lead 55 extends along branch 20 and connects to electrical contact 59. A portion of electrical lead 56 extends along branch 19 and connects to electrical contact 60. Parallel portions of leads 63 and 64 are located on opposite sides of resistor 37. A portion of lead 63 extends along branch 21 and connects to an electrical contact 67. A portion of electrical lead 64 extends along branch 20 and connects to electrical contact 68. Preferably, all of the electrical leads, electrical contacts and the resistors reside in substantially the same plane, slightly above or adjacent a top surface 69 of crystal 12, as shown more clearly in FIG. 2.

Crystal 12 also includes a membrane layer 72 that spans between the external sides 14, 15, 16 and 17. As viewed from the top, membrane layer 72 includes five distinguishable sections, four of which appear to be trapezoidal in shape, numbered 74, 75, 76 and 77, and another which is square in shape, designated by numeral 78. The trapezoidal shaped sections are all actually connected together around the inner rectangle, but this is not readily discernible from a top view. The square shaped membrane layer section 78 is located within the inner rectangle defined by inner sections 24, 25, 26 and 27. Preferably, a hole 79 is formed through center membrane layer section 78 to prevent build up of a pressure differential between top and the otherwise sealed bottom of the crystal 12. This would be particularly necessary where the anemometer 10 is used in extremely low pressure application, such as in outer space. Alternately, pressure buildup could be prevented by providing a hole through another part of the membrane layer 72, or along an outer edge of the crystal 12. The membrane layer 72 supports the bottoms of inner sections 24, 25, 26 and 27, but it is spaced downwardly from the branches 18, 19, 20 and 21. This space between the branches and the membrane 72 is formed by undercutting, from the top, selected parts of the crystal 12, as described subsequently in more detail.

Figure 2:
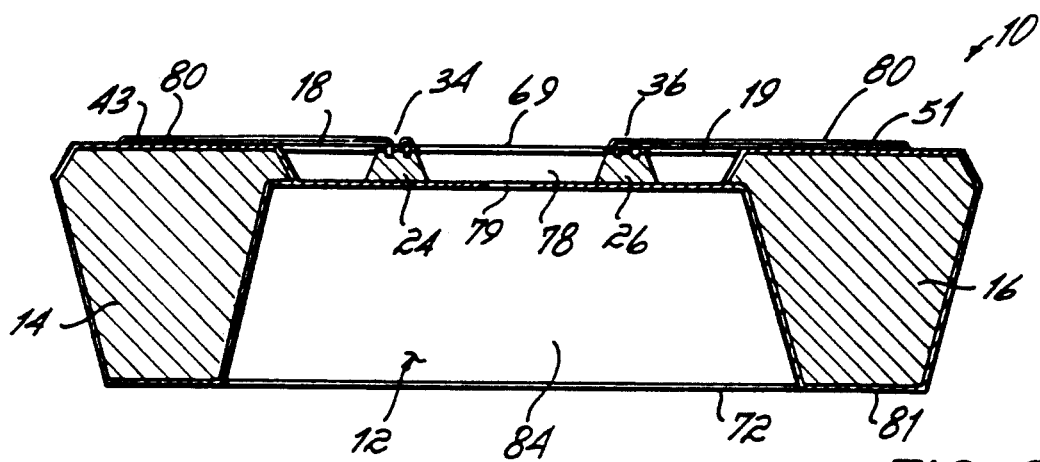
FIG. 2 is a cross-sectional view taken along lines 2—2 of FIG. 1.

FIG. 2 also shows a passivation layer 80 located above the conductive leads 39 and 56 and the contacts 43 and 60. The passivation layer is preferably either sputtered silicon dioxide ($SiO_2$) or chemically evaporated silicon nitride ($Si_3N_4$). The passivation layer 80 protects the outer surface of all the components of the anemometer 10, and it is the final step performed in producing the anemometer 10.

Figure 3:
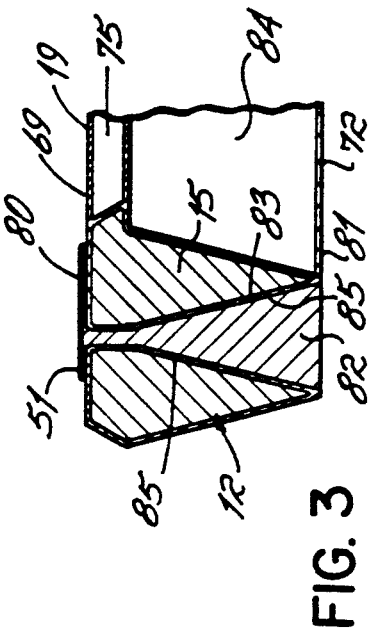
FIG. 3 is a partial cross-sectional view taken along lines 3—3 of FIG. 1.

FIG. 3 shows a partial cross-sectional view through one of the electrical contacts located adjacent a corner of the outer rectangle of the crystal 12. Electrically conductive material 82 resides within a recess 83 etched into a bottom surface 81 of crystal 12, beneath the contact 51, with a layer 85 of silicon dioxide located between the conductive material 82 and the rest of the crystal 12. Layer 85 is also filled within the recesses etched below contacts 43, 44, 52, 59, 60, 67 and 68. This construction permits connection to one or more external electrical components (not shown) via or through bottom surface 81, resulting in an anemometer 10 that is structurally more rigid. Electrical connection below top surface 69 also eliminates any effect that upwardly extending connecting wires or leads would have upon the fluid flow that is to be sensed.

Figure 4:
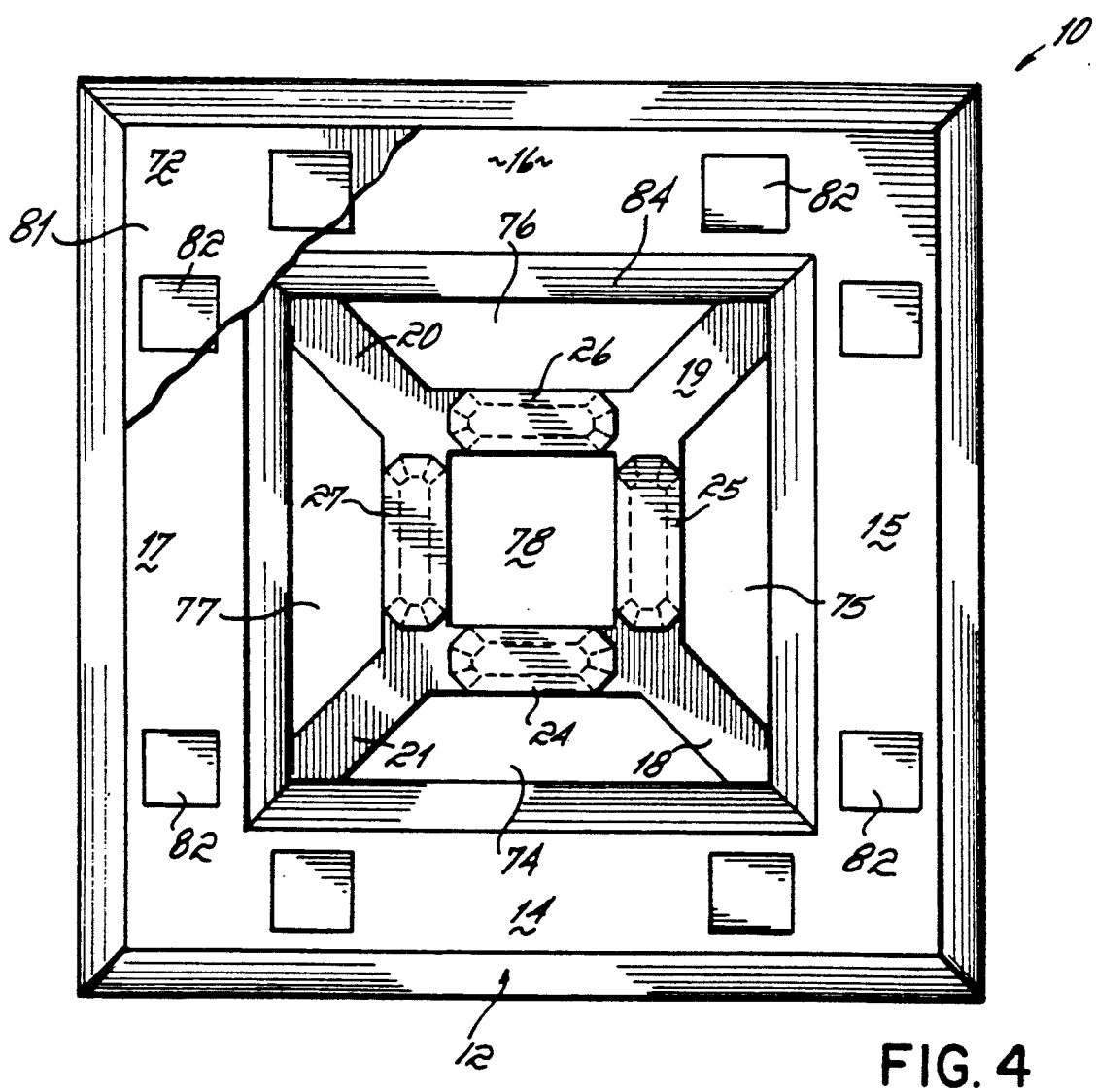
FIG. 4 is a bottom view of the solid state microanemometer shown in FIG. 1, with a portion removed to expose details of the bottoms of the branches and inner sections.

FIG. 4 shows a bottom view of the crystal 12, but excluding membrane layer 72. Inner sections 24, 25, 26 and 27 include semiconductive resistors 34, 35, 36 and 37, respectively, and the crystal 12 is micromachined during manufacture to thermally and electrically isolate these resistors from each other, i.e., physical connection via only the silicon dioxide branches. The resistors are also substantially isolated from the branches and external sides, i.e., physical connection via the silicon dioxide branches and a relatively small amount of electrically conductive material residing thereon.

In order to form the solid state microanemometer 10 in accordance with a preferred embodiment of the invention, a number of micromachining processing steps must be performed in sequence upon the single solid semiconductor crystal 12. For the most part, these steps include sequenced etching or oxidizing of selected parts of the crystal 12 to achieve the desired topography. While the sequence of steps is explained with respect to a single crystal, it is to be understood that these solid state devices are preferably formed by batch processing a large number of devices at a time. Moreover, the particular sequence of steps used to manufacture the anemometer 10 is not considered to be as important as the resulting structure. It is the structural configuration which primarily produces the improved features of this solid state anemometer 10.

As mentioned previously, the crystal 12 is initially doped with a deep level impurity and at least the top 69 and bottom 81 surfaces are oxidized to form a layer of silicon dioxide ($SiO_2$). The top surface 69 is then processed to accommodate the parallel, inner section portions of the electrically conductive leads. This is done by using a photoresist to mask all of the top surface 69, except for the locations where the parallel portions of the conductive leads will eventually be deposited. Subsequent etching of these unmasked areas of the top surface 69 removes the silicon dioxide from under the desired regions, leaving the rest of top surface 69 intact. Then an n+ material such as phosphorus is diffused to a density of about $10^{18}$ A/cm$^3$ into the crystal 12 at these etched areas where the parallel portions of conductive leads 39 and 40, 47 and 48, 55 and 56 and 63 and 64 will be formed. Preferably, adjacent each of the ends of what will eventually become the four inner sections, a transversely oriented region of the same material is also diffused into the crystal. The eight transversely oriented diffused regions roughly define those locations where the corners of the inner rectangle will be located.

The diffused areas under the leads will promote good ohmic contact to the crystal 12 for the subsequently deposited parallel portions of the conductive leads. The transversely diffused regions will eventually be used to selectively etch under the corners of the inner rectangle to thermally and electrically isolate the resistors from each other. Use of n+ phosphorus doping renders these areas particularly susceptible to etching by hydrazine, a substance which will not etch silicon dioxide. Therefore, this initial diffusion prepares these regions for subsequent undercutting by etching with hydrazine from the top surface.

Subsequently, the bottom surface 81 is etched to form the outer rectangle defined by the four external sides 14, 15, 16 and 17. A numeral 84 designates the void that remains after material has been removed to form the external sides. If the crystal 12 is anisotropically etched, the side walls of the external sides will taper downwardly, as shown in the Figures. Within the void 84, the crystal 12 is again oxidized to form a layer of silicon dioxide that will ultimately become the membrane layer 72, and oxidized side walls 85. Silicon dioxide plays an important role in this invention. Because it is neither thermally nor electrically conductive, it may be used for physical connection or structural support of the semiconductor resistors without compromising the thermal or electrical isolation of these resistors from each other. In short, the silicon dioxide membrane layer 72 provides structural cohesion between the outer and inner rectangles, and it does so in a manner that does not result in an increase in electrical and/or thermal conductivity therebetween. As a result, compared to prior solid state anemometers, the anemometer 10 of this invention permits operation of the resistor sensing bridge at higher temperatures, thereby improving flow sensing capability.

Simultaneously with the backside etch to produce void 84, or separately, if desired, the bottom surface 81 may also be etched to produce recesses underneath the contacts, an example of which is shown in FIG. 4. Silver epoxy may then be either filled into these recesses by shadow masking techniques or by evaporation. Alternately, aluminum or other conductive material may be deposited into the recesses by chemical evaporation or any other suitable method to substantially fill the recesses with conductive material. Preferably, as shown in FIG. 4, an oxidation step occurs prior to filling of the recesses with conductive material.

Next, aluminum or other conductive material is evaporated or deposited onto top surface 69 to form contacts 43, 44, 51, 52, 59, 60, 67 and 68 and conductive leads 39, 40, 47, 48, 55, 56, 63 and 64. The parallel portions of the conductive leads are deposited onto the parallel n+ diffused regions of the crystal. The resistors 35, 36, 37 and 38 are integral portions of the original semiconductive crystal 12, and they reside on the respective inner sections 25, 26, 27 and 28 between and beneath parallel portions of the respective conductive leads.

Thereafter, selected regions of the top surface 69 are etched to a depth of the silicon dioxide membrane layer 72 to expose the top surface of the membrane layer 72 at sections 74, 75, 76, 77 and 78 and to leave intact the branches 18-21 and the inner sections 24-27. The branches and inner sections are left intact because their top surfaces are of silicon dioxide, which is not susceptible to the etchant. One important aspect of this invention becomes apparent during this initial top surface etching step. This aspect relates to the utilization of diagonal branches to connect the inner and outer rectangles. The forty five degree angle of the branches 18-21 with respect to the adjacent external sides 14-17 and the inner sections 24-27 exposes the crystal 12 along crystal planes which permit material removal or "undercutting" of silicon when etched from the top of the crystal 12. This etching step substantially removes all the silicon from underneath the relatively thin silicon dioxide branches. Undercutting occurs all the way to membrane layer 72.

This initial top surface etching step may be performed long enough to also remove the silicon under the corners of the inner rectangle. However, this would also remove some of the silicon of the resistors themselves, particularly along the inner and outer edges. Therefore, it is preferable to etch under the corners by initially attacking this material via selective etching of n+ doped regions with hydrazine. Applicant has learned that n+ phosphorus diffused silicon is selectively etched by hydrazine, or etched at a very rapid rate compared to other materials. Once the diffused regions are removed, the rest of the underlying corner material is rapidly removed from under the corners of the inner rectangle to isolate each of the silicon resistors. As a result of the top surface etching step, or steps, the silicon resistors of the inner sections contact mostly silicon dioxide and some conductive material, but no other silicon. In short, the silicon resistors are thermally and electrically isolated from each other.

While etching to isolate the inner rectangle from the outer rectangle and to undercut the inner rectangle corners may be performed with hydrazine in one step, it is preferable to use two etching steps, with KOH or EDP used to undercut the branches and hydrazine used to undercut the corners. The order of these two etching steps is not considered critical, though it is probably preferable to initially etch under the branches with KOH or EDP. Because KOH and EDP will attack deposited aluminum, it is necessary to sputter silicon dioxide onto the top of the conductive leads and contacts prior to this particular etching step.

Alternatively, gold may be used instead of aluminum. Gold is not susceptible to KOH or EDP. Moreover, gold has a higher melting temperature than aluminum, so that the resulting anemometer 10 could be used at higher temperatures. However, the use of gold solves one problem but creates another. Due to the relatively low gold/silicon eutectic melting temperature, the otherwise high melting temperature of gold is significantly reduced in this structure. As a solution to this problem, if gold is to be used for resistive sensing at relatively higher temperatures, an intermediate layer of chromium is first deposited onto the silicon and then the gold is deposited onto the chromium. This prevents any undesirable gold silicon interface and permits rapid KOH or EDP etching of crystal 12 with no adverse affects to the contacts or leads.

As a final step, the entire outer surface of the anemometer 10 is passivated by sputtering of silicon dioxide or chemical evaporation of silicon nitride. This ensures protection of any otherwise exposed areas of the outer surface of the crystal 12.

The final solid state anemometer 10 provides optimum sensing capability in all modes of resistance fluid flow detection. Due to its extremely small size and versatility in application, a large number of these solid state anemometers 10 may be located in a relatively small area in separate groups or arrays, with the devices operating independently to sense flow in each of the various flow sensing modes. The device 10 may be viewed as a generic flow sensor adapted for operation in any selected sensing mode.

The dimensions of the resistor sensing bridge of this solid state microanemometer 10 are about the same as the sensing bridge of U.S. Pat. No. 4,930,347, though some dimensional variation may be desirable. The practicalities of micromachining and electrical connectability to other external devices dictate the lower size limit of this microanemometer 10, while considerations such as response time, space availability and the application may dictate upper size limits.

While a preferred embodiment of the invention and a preferred method for manufacturing the invention have been described, applicant does not wish to be limited thereby, and it is to be understood that various modifications could be made without departing from the spirit of the invention. For instance, other micromachined topographical shapes would also be acceptable, so long as the shape provides at least one, but preferably four, semiconductor resistors in a sensing bridge wherein each resistor is thermally and electrically isolated from the other resistors and substantially thermally and electrically isolated from the rest of the original crystal. Accordingly, it is to be understood that changes may be made without departing from the scope of the invention as particularly set out and claimed.

I claim:

1. A method of forming a microanemometer comprising the step of:
    selectively processing selected parts of a single semiconductor crystal to form a fluid flow sensing bridge with at least one semiconductor resistor, each semiconductor resistor in the sensing bridge being thermally and electrically isolated from every other semiconductor resistor in the sensing bridge.

2. The method of claim 1 and further comprising the steps of:
    selectively etching top and bottom surfaces of the crystal to a desired shape with four external sides defining an outer rectangle, four inner sections defining an inner rectangle, four branches interconnecting corners of the inner and outer rectangles and a membrane spanning between the four sides beneath the inner sections, the sensing bridge being located on the inner rectangle; and oxidizing selected parts of the crystal to isolate the semiconductor resistors from other thermally conductive and electrically conductive parts of the crystal.

3. The method of claim 2 and further comprising the step of:

depositing electrically conductive contact material on selected portions of the external sides, branches and inner sections, each resistor aligned along an inner section between and below parallel portions of conductive material.

4. The method of claim 2 wherein the crystal is etched to provide external sides thicker than the inner sections and inner sections thicker than the branches.

5. The method of claim 3 and further comprising the step of:

electrically connecting the electrically conductive contact material to at least one external electrical component to measure fluid flow across a top surface of the crystal via the sensing bridge.

6. The method of claim 5 wherein the resistors and electrically conductive material reside substantially in a common plane and said electrical connecting step is performed beneath said common plane.

7. The method of claim 6 wherein the electrical connecting step further comprises the step of:

etching through a bottom surface of the crystal to form at least one recess to provide electrical connection access to the bottom surfaces of the contacts.

8. The method of claim 7 and further comprising the step of:

depositing conductive material into the recesses to facilitate electrical connection to the contacts.

9. The method of claim 2 and further comprising the step of:

etching from a top of the crystal to undercut and remove selected thermally and electrically conductive parts of the crystal from under the respective branches.

10. The method of claim 9 wherein the undercutting etching step is performed for a sufficiently long time duration to also remove thermally and electrically conductive material from underneath corners of the inner rectangle, thereby to thermally and electrically isolate each resistor from the other resistors.

11. The method of claim 9 and wherein the undercutting etching step is performed with a first etchant and further comprising the step of:

selectively etching a region of the top surface of the crystal with a second etchant to selectively remove thermally and electrically conductive parts of the crystal from underneath the corners of the inner rectangle to thermally and electrically isolate each of the resistors.

12. The method of claim 11 and further comprising the step of:

diffusing, prior to the etching steps, an n+ material into the regions of the crystal adjacent positions where the corners of the inner rectangle will eventually be located, the n+ diffused regions of the crystal being particularly susceptible to etching by the second etchant, thereby to promote selective undercutting of the corners of the inner rectangle to thermally and electrically isolate each resistor from the other resistors.

* * * * *

UNITED STATES PATENT AND TRADEMARK OFFICE
CERTIFICATE OF CORRECTION

PATENT NO.   : 5,310,449
DATED        : May 10, 1994
INVENTOR(S)  : H. Thurman Henderson It is certified that error appears in the above-indentified patent and that said Letters Patent is hereby corrected as shown below:

Column 1,

Prior to the first line of the specification, please insert --This invention was made with government support under Contract NSG3-022\NAGW 1407 recorded by NASA. The government has certain rights in the invention.--

Signed and Sealed this

Twenty-fourth Day of March, 1998

Attest:

BRUCE LEHMAN

Attesting Officer

Commissioner of Patents and Trademarks